US009738206B2

(12) United States Patent
Scheer et al.

(10) Patent No.: US 9,738,206 B2
(45) Date of Patent: Aug. 22, 2017

(54) METHOD FOR LOADING AND UNLOADING A SPACE LOCATED ON A VEHICLE

(71) Applicant: LOHR ELECTROMECANIQUE, Hangenbieten (FR)

(72) Inventors: Daniel Scheer, Still (FR); Laurent Verdier, Eschau (FR)

(73) Assignee: LOHR ELECTROMECANIQUE, Hangenbieten (FR)

( * ) Notice: Subject to any disclaimer, the term of this patent is extended or adjusted under 35 U.S.C. 154(b) by 0 days.

(21) Appl. No.: 15/029,769

(22) PCT Filed: Oct. 17, 2014

(86) PCT No.: PCT/FR2014/052654
§ 371 (c)(1),
(2) Date: Apr. 15, 2016

(87) PCT Pub. No.: WO2015/055967
PCT Pub. Date: Apr. 23, 2015

(65) Prior Publication Data
US 2016/0243971 A1 Aug. 25, 2016

(30) Foreign Application Priority Data

Oct. 17, 2013 (FR) ...................................... 13 60129

(51) Int. Cl.
*B60P 3/08* (2006.01)
*B60P 1/48* (2006.01)
(Continued)

(52) U.S. Cl.
CPC ............. *B60P 1/483* (2013.01); *B25J 9/0087* (2013.01); *B60P 1/02* (2013.01); *B60P 1/48* (2013.01); *B60P 3/07* (2013.01); *B60P 3/08* (2013.01)

(58) Field of Classification Search
CPC .... B60P 3/07; B60P 1/483; B60P 3/08; B60P 1/5485; B60P 1/54; B25J 9/0087
See application file for complete search history.

(56) References Cited

U.S. PATENT DOCUMENTS 4,597,712 A * 7/1986 Smith ....................... B60P 1/00
414/253
4,690,609 A * 9/1987 Brown .................. B60P 1/5452
296/186.4

(Continued)

OTHER PUBLICATIONS

International Search Report from parent PCT application PCT/FR2014/052654 dated May 28, 2015, 2 pages.
(Continued)

*Primary Examiner* — Thomas Randazzo
(74) *Attorney, Agent, or Firm* — Tech Valley Patent, LLC; John Pietrangelo

(57) ABSTRACT

The present invention concerns a method for loading and/or unloading a loading space delimited by structural elements of at least one road or rail vehicle using a manipulator to move the loads from outside the loading space to a position onto the structural elements in the loading space and vice versa. The method includes: inputting or importing primary data relative to the loads into a logic controller, automatically calculating the optimum loading position for each load, determining the automated movements of the manipulator, automatically picking up a pallet in a storage position inside the loading space with the manipulator and positioning the pallet in a loading position located at the rear of the vehicle, placing a load on the pallet, and automatically moving the pallet supporting the load into the optimum loading position, and locking the pallet to the structural elements.

25 Claims, 7 Drawing Sheets

(51) Int. Cl.
  *B25J 9/00* (2006.01)
  *B60P 3/07* (2006.01)
  *B60P 1/02* (2006.01)

(56) References Cited

U.S. PATENT DOCUMENTS

| | | | | |
|---|---|---|---|---|
| 4,759,668 | A * | 7/1988 | Larsen | B60P 3/08 410/24 |
| 4,810,160 | A * | 3/1989 | Emiliani | B60P 1/5442 187/234 |
| 5,501,571 | A * | 3/1996 | Van Durrett | B65G 61/00 414/21 |
| 5,525,026 | A * | 6/1996 | DeMonte | B60P 1/02 410/24 |
| 6,486,787 | B2 * | 11/2002 | Rieger | B60P 1/483 340/611 |
| 7,114,905 | B2 * | 10/2006 | Dibdin | B60P 1/02 414/495 |
| 9,314,921 | B2 * | 4/2016 | Jacobsen | B25J 3/04 |
| 2004/0019471 | A1 | 1/2004 | Bush et al. | |
| 2009/0035116 | A1 * | 2/2009 | Johnson | B60P 1/483 414/631 |
| 2010/0054899 | A1 * | 3/2010 | Hacker | B60P 1/6463 414/470 |
| 2015/0063973 | A1 * | 3/2015 | Girtman | B25J 9/0093 414/796.9 |
| 2015/0360882 | A1 * | 12/2015 | Girtman | B65G 59/02 700/213 |

OTHER PUBLICATIONS

Written Opinion from parent PCT application PCT/FR2014/052654 dated May 28, 2016, 5 pages.

* cited by examiner

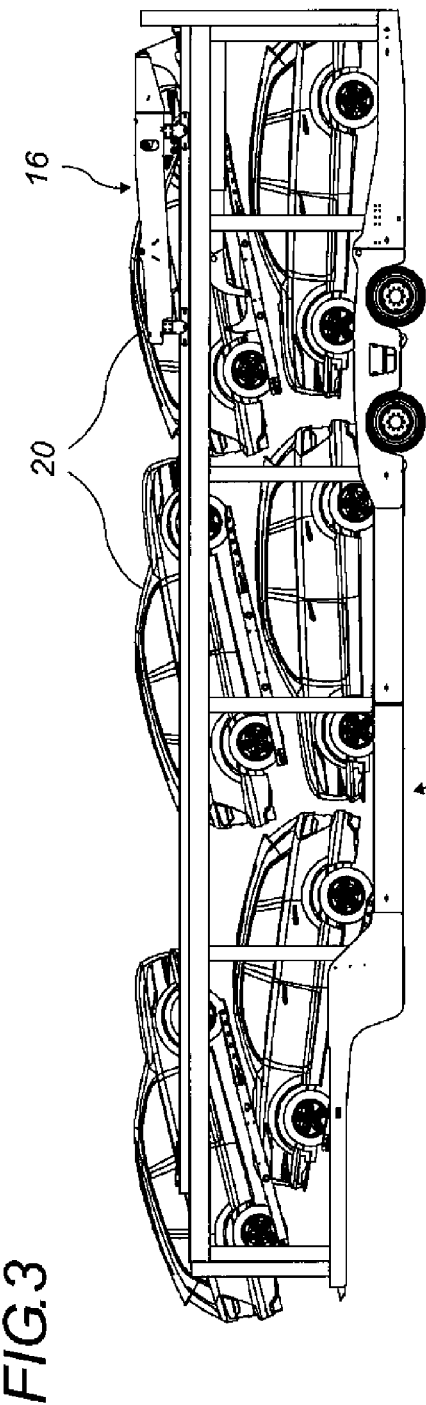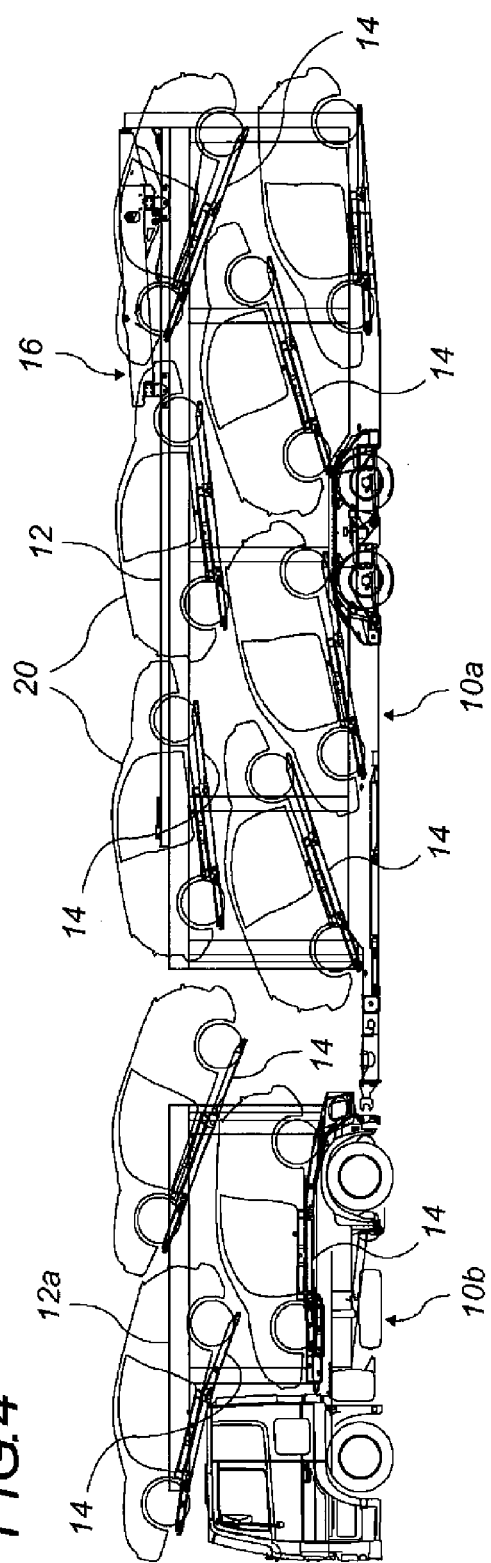

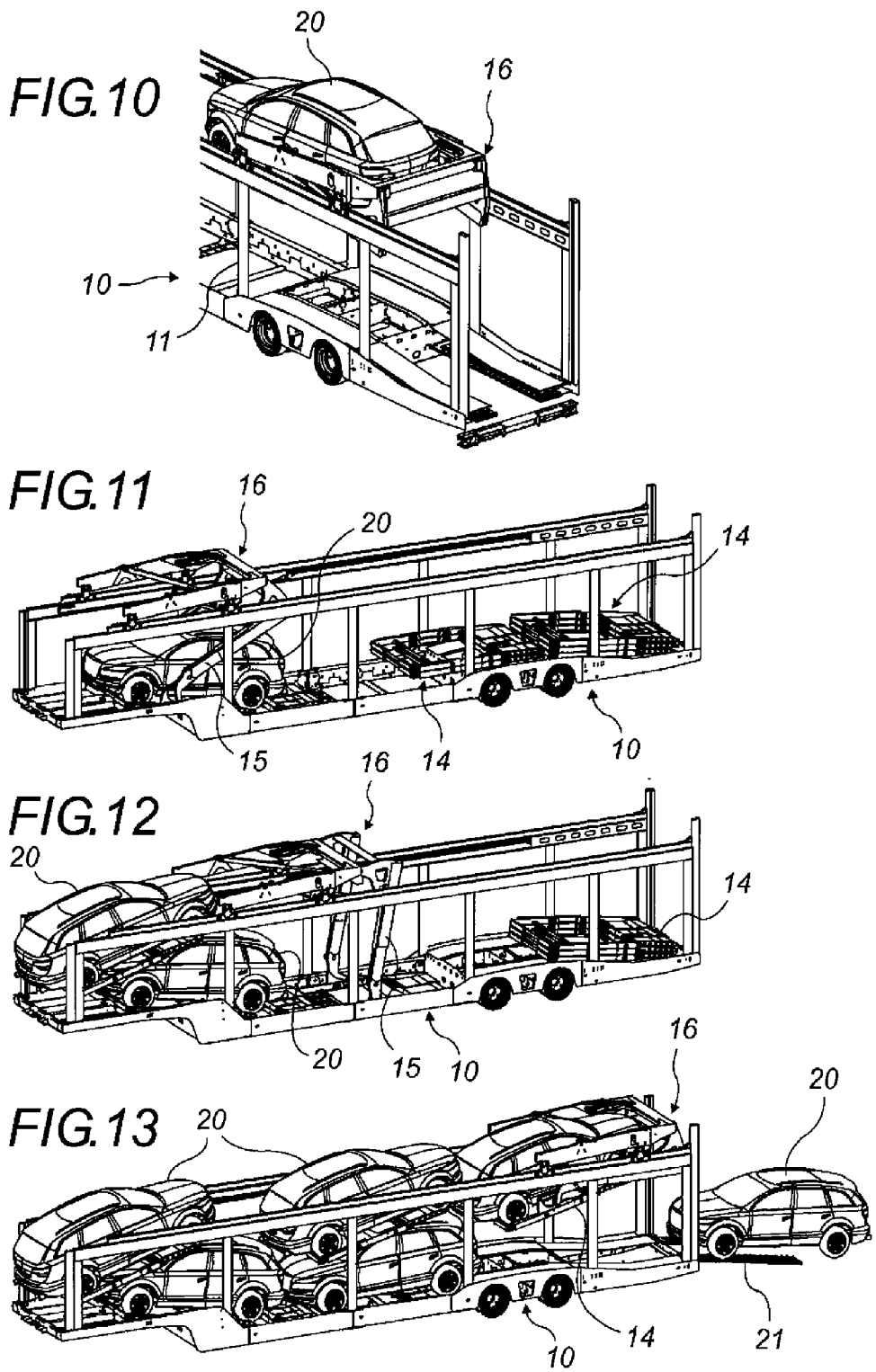

METHOD FOR LOADING AND UNLOADING A SPACE LOCATED ON A VEHICLE

CROSS-REFERENCE TO RELATED APPLICATIONS

This application is a §371 filing of PCT application PCT/FR2014/052654 filed on Oct. 17, 2014, which claims priority from French application FR 1360129 filed on Oct. 17, 2013. The disclosures of these applications are included by reference herein in their entirety.

BACKGROUND

Technical Field

The present invention concerns the general technical field of freight transport, and in particular the transport of loads carried on pallets. These loads can be, for instance, cars having identical or different gauge sizes.

The invention concerns more particularly a method for loading/unloading a loading space and a loading/unloading device for implementing the said method. Such a device can be used for equipping a road-going vehicle such as a van, trailer, semi-trailer, articulated convoy or container designed to be loaded onto a semi-trailer or container-carrier or a wagon.

State of the art

There is a known device described in document U.S. Pat. No. 4,597,712 for loading and unloading semitrailers. This device is mounted at the rear end of a loading space and has articulated arms for picking up laterally a vehicle bearing on wheel supports and moving the assembly towards a loading position. An operator using a control console controls the various operations and movements. A device of this type has the drawback of requiring to be controlled continuously by an operator. In addition, the operator does not always have all the information needed for optimal loading, unloading, transport or for distribution involving special requirements. It sometimes happens that the loads, in the present case, cars, are placed in loaded positions that are not optimal or may even be dangerous. A loading error can then only be corrected by moving at least some of the loads again. The result is in particular a substantial loss of time. Operator reckoning carries out the gripping of the cars, which has to be carried out by the positioning of gripping arms without tipping over the car. Gripping can therefore be a time-consuming operation and a relatively dangerous one.

There is also a known loading system described in the document U.S. Pat. No. 5,525,026 under the name of Walter P. DeMonte, which embodies a number of drawbacks. Indeed, the described system comprises non-optimized automation. In addition, operator action is required in the event of unlocking of the pallet. No automated corrective action is possible.

DISCLOSURE OF THE INVENTION

Accordingly, the purpose of this invention is to overcome the drawbacks of the prior art by proposing a novel loading/unloading method, which is simple, fast and reliable to implement.

Another goal of this invention is to propose a novel loading/unloading method giving an operator optimal assistance, in particular by taking into consideration a large amount of data relative to loading, unloading or transport requirements.

Another goal of this invention is to supply a new loading/unloading device for implementing the new loading/unloading method.

The assigned goals of the invention are achieved by a method for loading/unloading a loading space delimited by structural elements of at least one road or rail vehicle, or a container, with loads comprising, in particular, cars and/or freight, consisting in using a motorized manipulator comprising two articulated arms, in particular in their upper portion, to move the loads from outside the loading space toward a loading position on the structural elements in the loading space and vice versa, characterized in that it consists in:

a—inputting or importing primary data relative to the loads into a logic controller, b—automatically calculating, by means of onboard or remote intelligence, the optimal loading position for each load according to the primary data and complementary data relative to requirements of loading and/or unloading, transport and/or distribution of the loads, c—automatically determining, by means of onboard or remote intelligence, the automated movements of the motorized manipulator by virtue of the logic controller, as a function of calculations made during step b), d—automatically picking-up, by means of the motorized manipulator, a pallet in a storage position in the loading space and positioning said pallet in a loading position located at the rear of the vehicle, e—placing a load on the pallet and f—automatically moving, by means of the motorized manipulator, the pallet carrying the load to the optimal loading position and locking said loaded pallet on the structural elements of the vehicle automatically and under the control of the logic controller.

The assigned goals of the invention are also achieved by an unloading method of a vehicle loaded using the loading method according to claim 1, following a load transport phase, characterized in that it consists in:

g—using all the recorded data relative to loading, to determine an unloading sequence for the loaded pallets placed in the loading space, h—automatically unlocking a loaded pallet to be unloaded and moving said loaded pallet using the motorized manipulator to an outside unloading position at the rear of the vehicle, i—removing the load from the pallet and j—bringing back and depositing automatically using the motorized manipulator the empty pallet in a storage position in the loading space.

The term "optimal loading position" refers to a position which is compatible with a maximal loading volume while appropriately using the quantity and distribution of the loads in the loading space.

According to one implementation example according to the invention, the method consists in repeating loading operations d) to f) and unloading operations g) to i) in such a way as to load, and respectively unload, the entire vehicle.

According to another implementation example according to the invention, the method consists in moving the motorized manipulator, in a guided way, over the structural elements in order to reach each of the determined loading positions.

According to an implementation example according to the invention, the method consists in loading/unloading a train of vehicles, such as a tractor vehicle and a trailer, comprising a first vehicle comprising a first loading space and a second vehicle articulated on the first and comprising a second loading space.

According to an implementation example according to the invention, the method consists, on completion of the loading/unloading operations, in retracting the motorized manipulator to a defined transport position on the structural elements. The motorized manipulator is then positioned for instance in a rear space located at a high point of the loading space.

According to an implementation example according to the invention, the method consists in moving during the loading some of the pallets from one storage area to another, in order to better distribute the loads on the vehicle.

According to an implementation example according to the invention, the method consists in using an onboard logic controller.

According to an implementation example according to the invention, the method consists in exchanging information with an operator and/or with storage databases, via a wireless communication link connecting the logic controller to operator equipment such as a PC computer, a touch tablet, or a mobile phone.

According to an implementation example according to the invention, the method consists in transmitting loading instructions to the operator with, in particular, the driving direction on the pallets when the loads are cars or as per the identification of the loads to be placed on the pallet picked up by the motorized manipulator.

According to an implementation example according to the invention, the method consists in regularly updating the data recorded in the storage databases feeding the logic controller.

According to an implementation example according to the invention, the method consists in using storage databases that are delocalized with respect to the logic controller.

According to an implementation example according to the invention, the method consists in using a means of data input so that the operator can input into the logic controller additional information, linked for instance to loading, to unloading, or to unexpected requirements which must be taken into consideration to perform the loading operations d) to f) or the unloading operations g) to i)).

According to an implementation example according to the invention, the method consists in immobilizing the pallet carrying the load outside the vehicle at a given height, to more easily strap and/or unstrap the load on the pallet.

According to an implementation example according to the invention, the method consists in supplying the logic controller with an instruction to continue the loading or unloading operation as soon as the respective operations for strapping or unstrapping the load are complete.

According to an implementation example according to the invention, the method consists in transmitting instructions to the operator for strapping the loads between steps e) and f). It is evident that an unstrapping operation is then required during unloading.

For instance, the loads essentially consist of cars.

The assigned goals of the invention are also achieved by a loading/unloading device implementing the loading/unloading method described above, comprising a motorized manipulator with two articulated arms, in particular in their upper section, designed to work together with a vehicle to move the loads from outside a vehicle loading space to a loading position on the structural elements in the loading space and, inversely, characterized in that it includes:

on-board or remote intelligence means;
a logic controller controlling the automatic movements of the motorized manipulator according to the calculations of the on-board or remote intelligence means, using primary and/or complementary data,
picking up and orientation devices enabling the motorized manipulator to pick up and orient the loaded or unloaded pallets,
guidance and orientation means for moving and orienting the motorized manipulator along the structural elements of the vehicle,
means of locking/unlocking the pallets in their loading position on the structural elements by means comprising automated actuating devices controlled by the logic controller, and
means of communication between the logic controller and the operator supervising the automated loading and unloading operations.

According to an embodiment of the device according to the invention, the motorized manipulator has two lateral articulated arms designed to pick up a pallet, each lateral arm being, one the one hand, mounted to swivel with its upper section on a carriage moving along a guide rail arranged in the upper part of the structural elements and, on the other hand, ensuring with its gripping end part, a swiveling mounting on one side of the picked up pallet.

According to an embodiment of the device according to the invention, the structural elements and the pallets have respective attaching devices cooperating together to lock and unlock the pallets in their loading position, on the structural elements.

According to an embodiment of the device according to the invention, each guide rail has a mobile or telescopic section enabling said guide rail to lengthen in order to extend at least partly above the second loading space of the second vehicle articulated on the first vehicle, or to form a junction with rails present in the second loading space so that the carriages can then move from one loading space to another.

According to an embodiment of the device according to the invention, the guide rails are electrically conducting, connected to a source of electric energy and feed electric energy to the carriages by means of shoes.

Advantageously, the carriage comprises two integral parts each moving on a longitudinal rail.

According to an embodiment of the device according to the invention, the lateral arms are telescopic.

According to an embodiment of the device according to the invention, the manipulator is associated with a vehicle and carried on said vehicle.

According to another embodiment of the device according to the invention, the manipulator is associated with a loading/unloading base and remains on said loading/unloading base. Therefore, the manipulator is not carried on board and remains, for instance, at the end of a car production line in a fixed installation. This contributes to substantially lightening the weight of the vehicle or car transporter.

According to another embodiment of the device according to the invention, the manipulator is a removable module, which can be separated from the vehicle so as to equip or not equip, said vehicle. Accordingly, the vehicle can be deprived of such a manipulator when it is carrying out rotations between loading spaces each of which is equipped with such a manipulator.

One advantage of the loading/unloading method according to the invention is the high level of automation achieved for loading and unloading operation.

Another advantage of the loading/unloading method according to the invention is that it takes into account a high number of data linked, for instance, to the requirements of transport, of loading and/or of the organization of load distribution/delivery.

Another advantage of the loading/unloading method according to the invention is that it takes into consideration, in real time, additional parameters input by the operator, and which can influence, for instance, loading and/or unloading. For instance, this could concern loading operation of modified loads, obliging the calculator to calculate again a new optimal loading. It could also concern defects in the structural elements rendering the corresponding loading positions inaccessible.

Another advantage of the loading/unloading method according to the invention is the substantial gain in time during loading and unloading operations. Indeed, by automating these operations the operator can, for instance when loading cars, go and fetch another car to be loaded, while the logic controller automatically moves a car to its loading position. A similar gain in time is made during unloading operations.

One advantage of the loading/unloading device according to the invention comes from the high reliability it provides, despite a high level of automation.

Another advantage of the loading/unloading device according to the invention comes from the fact that it is adaptable to loads of different types.

Another advantage of the loading/unloading device according to the invention comes from the fact that it allows very easy and totally safe loading and unloading of the separate loading spaces of an articulated convoy, comprising for instance an articulated trailer and a tractor vehicle.

Another advantage of the loading/unloading device according to the invention comes from the fact that the logic controller only performs the orders received from onboard or remote intelligence means. This on-board intelligence means can be for instance a computer connected to the logic controller whereas the remote intelligence means can be, for instance, a computer located in a central processing unit having remote communication to the logic controller.

This on-board or remote intelligence uses specific software designed for making the necessary calculations from primary data and/or complementary data to determine the optimal loading position and orientation of each load and to automatically determine the resulting movements for the loading of each load.

From these calculations, the on-board or remote intelligence then transmits the necessary movement instructions to the logic controller for the automated movement of the motorized manipulator.

Another advantage of the loading/unloading device according to the invention comes from the fact that the pallet locking check is performed using force sensors provided at least at each end of the pallet. When the motorized manipulator pulls the pallet, it checks that the at least four force sensors detect a force. If this is not the case, it means that the locking pegs are not engaged properly. The motorized manipulator then makes slight movements until a force is detected at all the force sensors. These force sensors are advantageously very robust and not liable to foul.

Accordingly, in the event of a malfunction being detected in locking activation, the loading/unloading device according to the invention generates a repositioning operation.

A repositioning operation like this between the pallet and the supporting structure consists in moving the pallets slightly so as to be able to use the positioning tolerances and thus activate the locking means reliably.

Another advantage of the loading/unloading device according to the invention comes from the fact that the on-board or remote intelligence, for its calculations, does not take into consideration only the dimensions of the loads, but also their shape or outline, weight and position of the center of gravity, to optimize loading. Another advantage of the loading/unloading device according to the invention comes from the fact that it uses a motorized manipulator comprising arms, which can be deployed at the rear of the loading vehicle without it being necessary to extend, even partially, the carriage containing the manipulator outside the gauge size of the loading vehicle.

By the use of rigid arms, the motorized manipulator is capable of manipulating loads having a high weight in total safety, without any risk of them swinging.

The loading/unloading device according to the invention is also designed to take into account for the bending of the articulated manipulator arms during the manipulation of heavy loads, which bending leads to a downward movement of the pallets, and the on-board or remote intelligence advantageously takes this bending into consideration in its calculations.

BRIEF DESCRIPTION OF DRAWINGS

Other characteristics and advantages of the present invention will appear more clearly from the reading of the following description, referring to the attached illustration, given as a non-limiting example in which:

FIGS. 3 and 4 are front views of an example of the embodiment of a vehicle which can be loaded and unloaded according to an implementation example of the loading/unloading method conforming to the invention.

FIGS. 7 to 13 represent an example of a vehicle in various loading phases during the implementation of the loading/unloading method according to the invention.

EMBODIMENT(S) OF THE INVENTION

The structurally and functionally identical elements shown on several separate figures are given the same numerical or alphanumerical reference.

Figure 1:
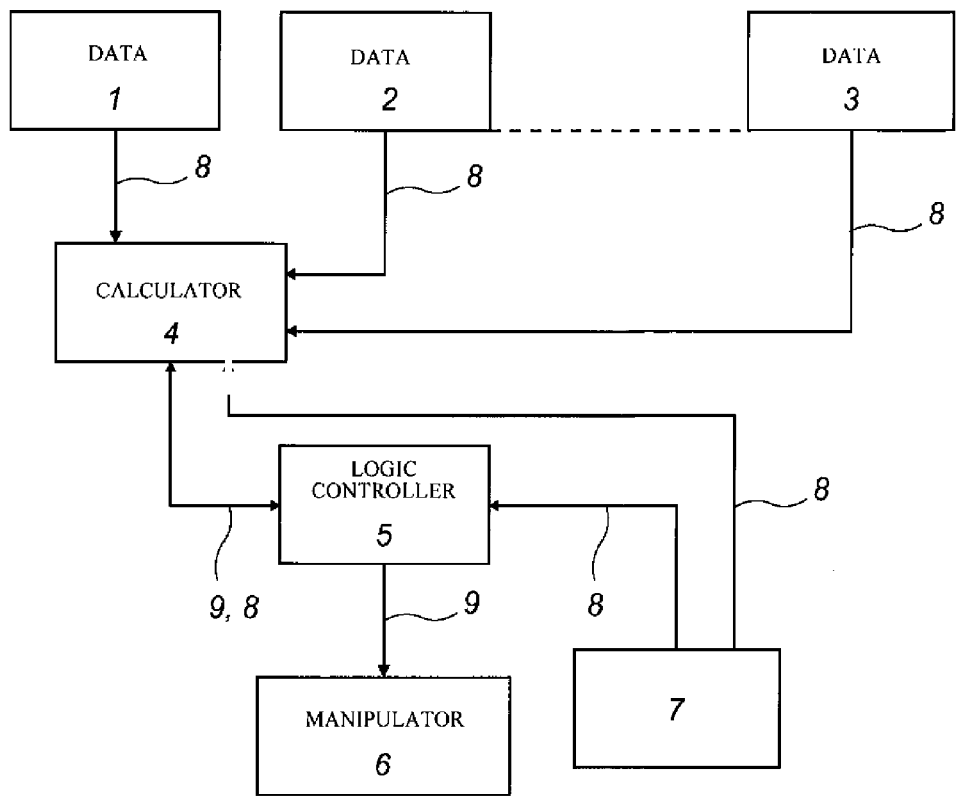
FIG. 1 is a functional flowchart illustrating an example of the implementation of the method according to the invention.

FIG. 1 is a functional flowchart illustrating an example of implementation of the method according to the invention. The loading/unloading method according to the invention is implemented using primary storage databases 1, 2, and 3. These data relate to load delivery requirements, transport regulation requirements (maximum authorized height, maximum authorized load per axle etc.) and/or to requirements related to the optimal distribution of the loads in the loading space or spaces.

Naturally, the number of storage databases 1, 2, 3 can be variable. A database 1 delocalized to the headquarters of the haulage company, a database 2 delocalized to a transport regulation service and a database 3 delocalized to a haulage company customer might be imagined.

The loading/unloading method according to the invention is implemented using also a calculator 4. The latter is supplied with data coming from one or several storage databases 1, 2, and 3. Appropriate software is loaded into the calculator 4 to determine the loading positions of the loads according to the received data. The calculator 4 is either onboard or delocalized, preferably in the haulage company headquarters.

The software then generates corresponding instructions, which are sent to an onboard logic controller 5 which controls the electric, hydraulic or pneumatic actuators of a motorized manipulator 6.

The movements of manipulator 6, picking up an empty or loaded pallet, are thus controlled in an entirely automated manner by logic controller 5. Advantageously, the latter includes electric or electronic means of controlling the actuators and means of memorizing the actuating instructions, predefined by calculator 4.

The loading/unloading method according to the invention is implemented using, according to an implementation variant of the invention, a means of communication 7 enabling an operator to communicate with the calculator 4 either directly, or via the logic controller 5.

For instance, the operator can input on a keyboard or on a touch screen specific data required for implementing the loading/unloading method according to the invention. Calculator 4 can then redefine if necessary the loading positions, the distribution of the loads or the loading or unloading orders by changing appropriately the instructions sent to logic controller 5.

As an example, communication links between the storage databases 1, 2, 3 and onboard calculator 4 are wireless links 8 of the GSM type. The communication link between the operator means of communication 7 and the calculator 4 or the logic controller 5 is for instance of the GSM or WIFI type.

The means of communication 7 is, for instance, a mobile phone, a portable computer or a touch tablet.

The control signals transmitted by the logic controller 5 to the actuators of manipulator 6 preferably pass through hardwire links 9 or through wireless links of the WIFI type.

Communication between calculator 4 and logic controller 5 is made either with a hardwire link 9 when said computer 4 is on board, or with a wireless link 8 when said calculator 4 is located at a distance, for instance in the haulage company's headquarters.

Other communication link configurations can also be considered as part of this invention.

Figure 2:
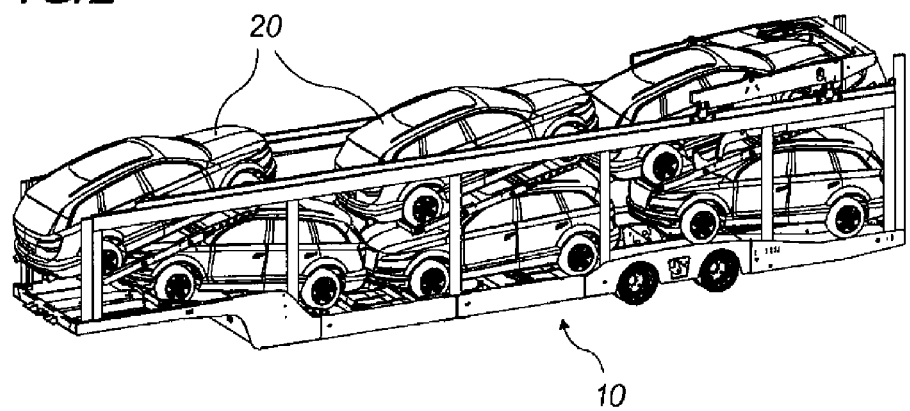
FIG. 2 is a perspective view of an embodiment of a vehicle which can be loaded and unloaded according to an implementation example of the loading/unloading method according to the invention.

FIG. 2 is a perspective view of an embodiment example of a vehicle, in this case a semitrailer loaded with cars 20.

FIGS. 3 and 4 are front views of embodiment examples of vehicles loaded with cars 20. The vehicle in figure 3 is a semitrailer 10 whereas the vehicle in figure 4 is a trailer 10a hitched to a motorized vehicle 10b.

FIG. 4 illustrates an articulated convoy comprising trailer 10a loaded with cars 20 arranged on pallets 14 according to a given distribution and motorized vehicle 10b, whose chassis constitutes at least in part the structural elements 11, delimits a second loading space.

The two loading spaces, one on trailer 10a, and the other on the chassis, are therefore available to the loads, such as cars, by means of longitudinal rails 12 of the trailer 10a, which have a mobile section enabling them to lengthen and extend towards the chassis to form a junction with the portions of longitudinal rails 12b of the chassis. The mobile parts of longitudinal rails 12 can also extend at least partly above the second loading space. A carriage 16 comprising the manipulator 6 can then move above the two loading spaces.

As a variant, it is possible to advance carriage 16 to a furthermost front position on trailer 10a and to immobilize it. The longitudinal rails 12 are then unlocked and translated forwards above the chassis by any known mechanism. Carriage 16 can then continue its movement above the chassis to place or pick up a loaded pallet 14. By moving again the longitudinal rails 12 in the opposite direction, the carriage 16 can move again as far as the rearmost end of trailer 10a.

Figure 5:
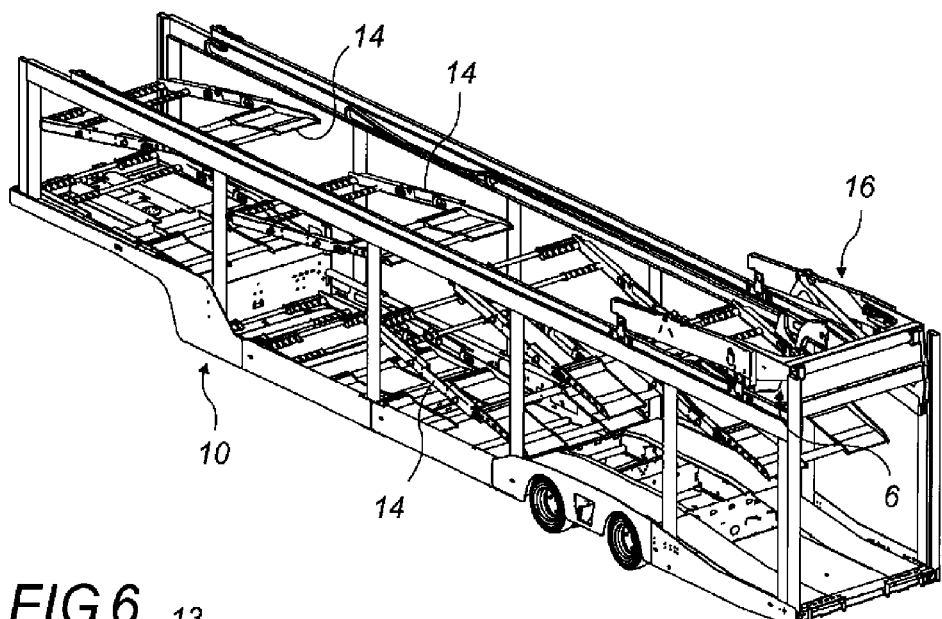
FIG. 5 is a perspective view of embodiments of vehicles with empty loading pallets, arranged in loading positions according to the method according to the invention.

FIG. 5 is a perspective view of an embodiment example of a semitrailer 10 with empty loading pallets 14, arranged in loading positions according to the method according to the invention. Carriage 16 and manipulator 6 are positioned in a transport position located in the upper and rear part of the semi-trailer 10.

Figure 6:
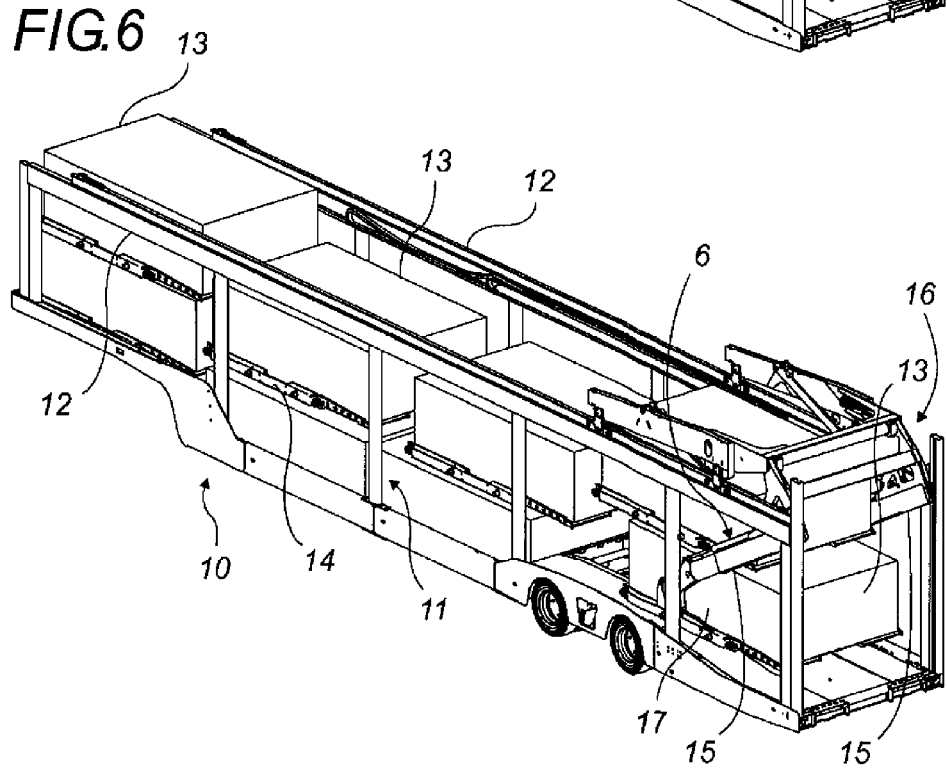
FIG. 6 is a perspective view of an embodiment of a vehicle with pallets supporting loads, arranged in loading positions according to the method according to the invention.

FIG. 6 is a perspective view of an embodiment example of a vehicle, which can be loaded and unloaded according to an implementation example of the loading/unloading method according to the invention. The vehicle consists of a semi-trailer 10 comprising structural elements 11 delimiting a loading space. The structural elements 11 are, for instance, lateral uprights connected at their upper ends by a longitudinal rail 12.

Loads 13 are positioned on structural elements 11 by means of pallets 14.

The manipulator 6 has two lateral arms 15 designed to pick up a pallet 14. Each lateral arm 15 is, on the one hand, mounted to pivot with its upper part on a carriage 16 moving on the longitudinal guide rails 12 and, on the other hand, ensure, with its lower end part, the picking up of pallet 14. This picking up is realized on each lateral side of pallet 14.

To do this, each lateral arm 15, at its lower end, has a gripping device 17 enabling to make an articulated link with pallet 14. Gripping device 17 advantageously includes retracting prongs which engage into corresponding housings arranged more or less at the center of each lateral edge of pallet 14. Pallet 14 can then be locked onto the lateral arms 15.

FIGS. 7 to 13 represent a semi-trailer 10 in various loading configurations during the implementation of the loading/unloading method according to the invention.

Figure 7:
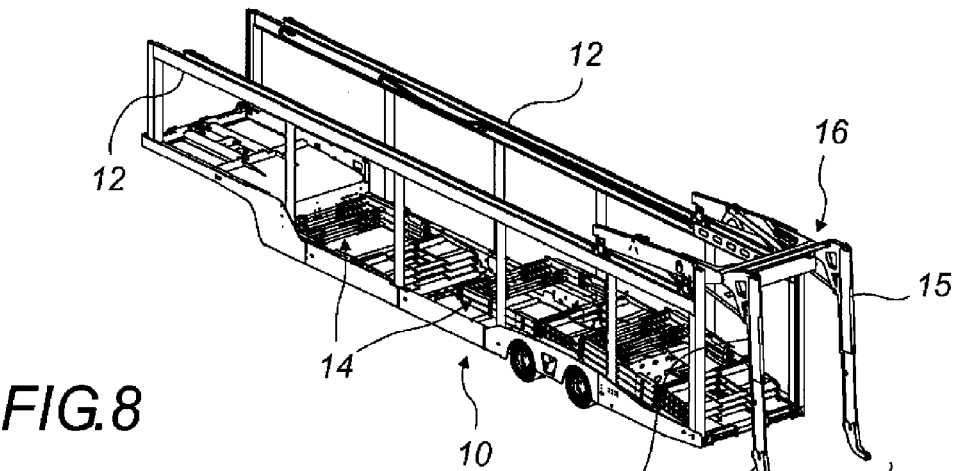

FIG. 7 therefore depicts an empty loading of semi-trailer 10. Manipulator 6 is placed at the rear of semi-trailer 10 with the lateral arms 15 oriented downward in order to allow the loading operation to begin. The pallets 14 stand on the bottom of the loading space of semi-trailer 10.

Figure 8:
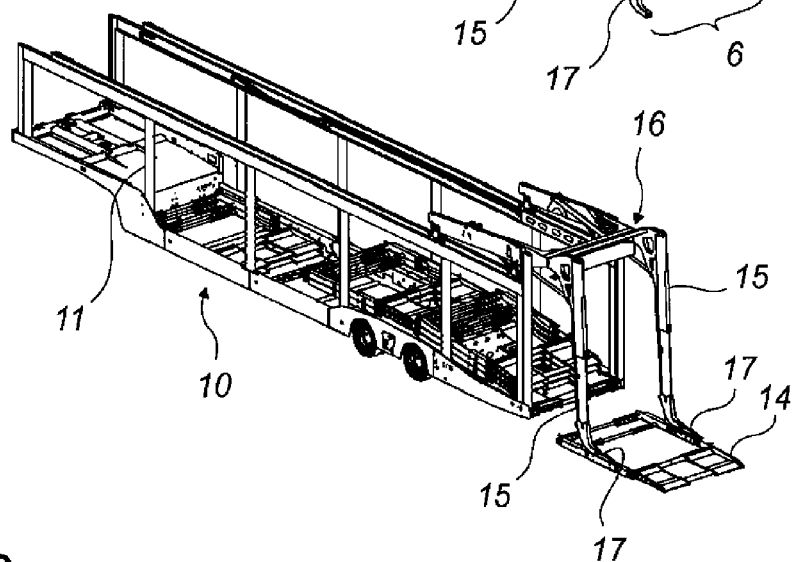

FIG. 8 shows the manipulator 6 picking up by means of the lateral arms 15 a first pallet 14 in the loading space and placing it at the rear of the semi-trailer 10, for instance on the floor, for loading purposes.

Figure 9:
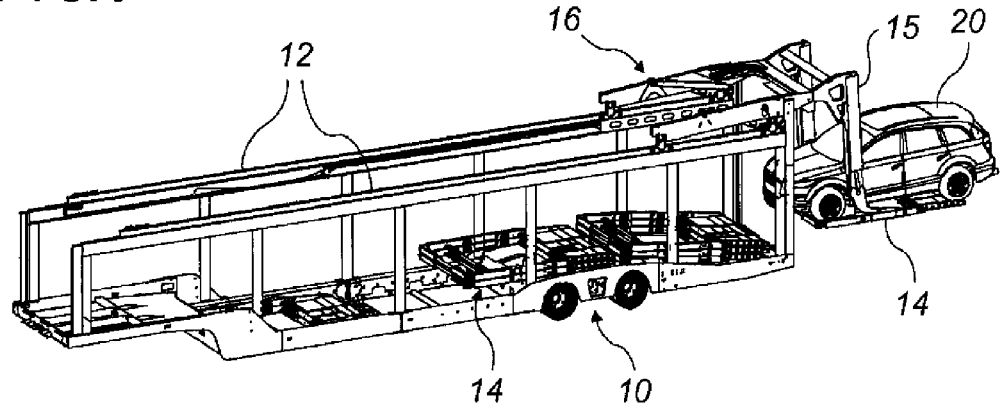

FIG. 9 shows the pallet 14 supporting a vehicle 20 and rose by the lateral arms 15. The pallet 14 loaded in this manner is then moved into the loading space of the semi-trailer 10 by means of the carriage 16 rolling on the longitudinal rails 12.

FIG. 10 illustrates a loading phase in which the lateral arms 15 raise to the maximum height the pallet 14 supporting the car 20. The carriage 16 can then move the car 20 toward the front of the loading space, for instance by passing over a load or another car 20 already placed in the loading space.

FIG. 11 shows the placing of the pallet 14 supporting the first car 20 at the front of the semitrailer by means of carriage 16 and lateral arms 15. The motorized manipulator 6 can then pick up another empty pallet 14 to continue the loading of the semi-trailer 10.

FIG. 12 thus shows the motorized manipulator 6 when it picks up with the lateral arms 15 an empty pallet 14 after positioning and locking the second car 20 in the loading space of semi-trailer 10.

FIG. 13 therefore depicts the last phase of loading the semi-trailer 10. This latter is already loaded with five cars 20 and the remaining loading space allows a sixth car 20 to be loaded using ramps 21. This last car 20 must be driven to its loading position by the operator, because the motorized manipulator 6 is no longer capable of manipulating and moving the last loaded pallet 14, when the one before last car 20 is placed with its pallet 14 in the rear and upper position of the loading space.

According to another embodiment, not shown, the ramps 21 are replaced by a platform sliding along beams and actuated by hydraulic or electric means.

Figure 14:
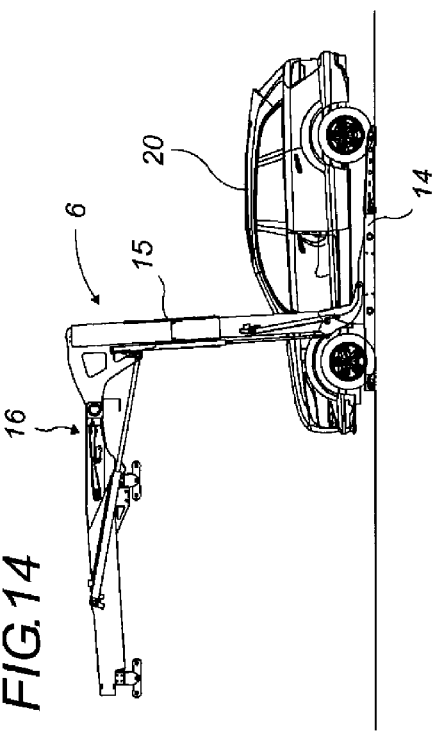
FIGS. 14 to 17 illustrate various positions of the motorized manipulator during a picking up and loading operation of a pallet carrying a car.
Figure 15:
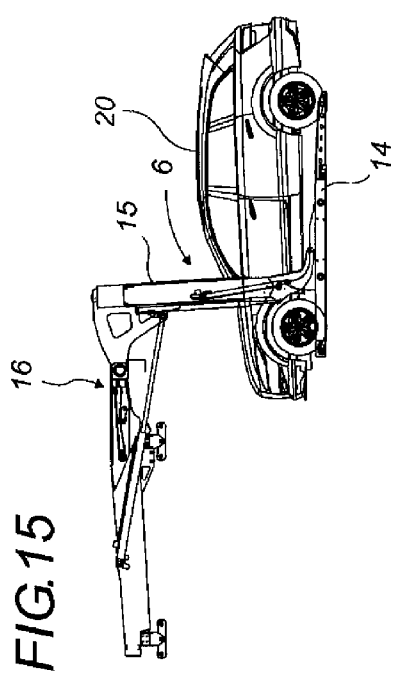
Figure 16:
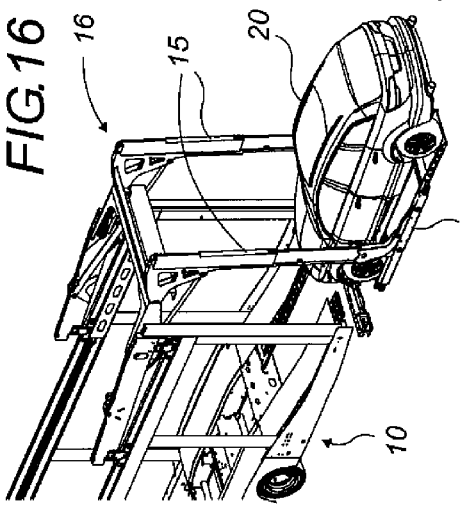
Figure 17:
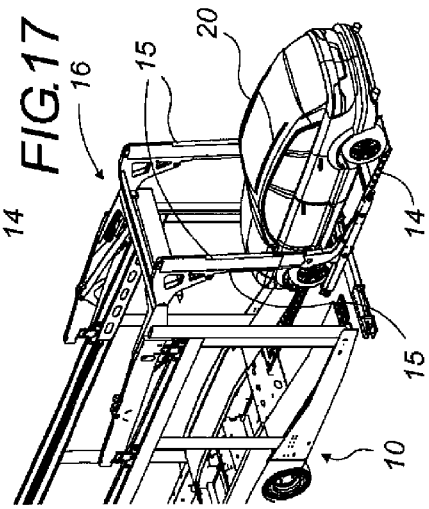

FIGS. 14 to 17 illustrate various positions of the motorized manipulator 6 during a picking up and loading operation of a pallet 14 carrying a car 20 in the rear position. FIGS. 14 and 16 illustrate respectively by a partial front view and a partial perspective view, the motorized manipulator 6 placing a pallet 14 on the floor. This pallet 14 is loaded with a car 20. FIGS. 15 and 17 illustrate respectively by a partial front view and a partial perspective view, the motorized manipulator 6 placing a loaded pallet 14 in an intermediate position. The latter is used for raising the loaded pallet 14 from the floor. This stabilized intermediate position enables the operator, for instance, to strap the car 20 onto pallet 14 before the motorized manipulator 6 continues the loading phase.

Figure 18:
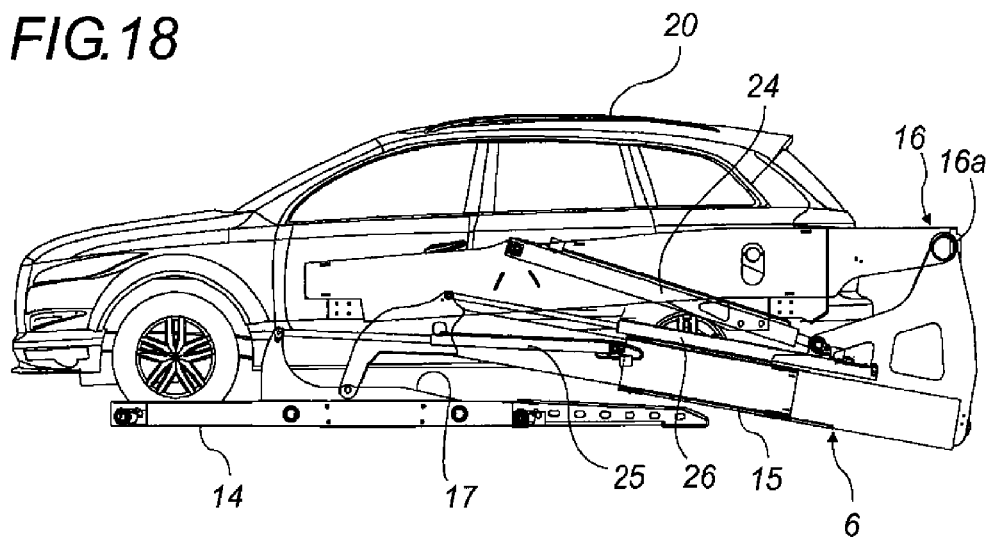
FIG. 18 illustrates the motorized manipulator moving a loaded pallet in the upper part of the vehicle, towards a loading position.

FIG. 18 illustrates the motorized manipulator 6 moving a loaded pallet 14 in the upper part of the vehicle, towards a loading position. The pallet 14 is held essentially horizontal during this movement phase.

FIG. 18 illustrates an embodiment example of a telescopic lateral arm 15 articulated on carriage 16. Swiveling about an articulation 16a is obtained for instance by a first control cylinder 24. A second control cylinder 25 obtains the swiveling of the gripping device 17 with respect to the lateral arm 15. A telescopic cylinder 26 is for instance associated with each telescopic lateral arm 15.

Figure 19:
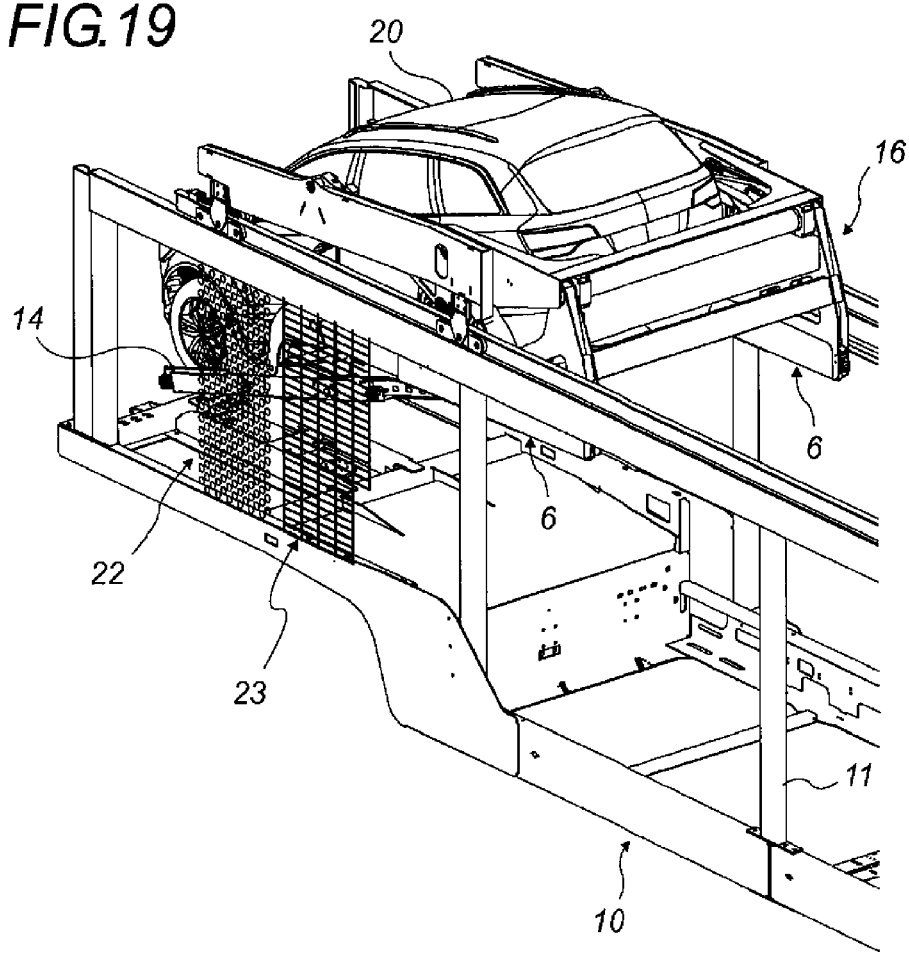
FIG. 19 illustrates the motorized manipulator when it has placed the loaded pallet in its locking position on the vehicle structure, which includes examples of a lattice permitting a longitudinal and vertical locking of the pallet.

FIG. 19 illustrates the motorized manipulator 6 when the latter has put the loaded pallet 14 in a locking position on the vehicle structure. The structure or the lateral walls of the vehicle advantageously include locking areas, 22 or 23 which are provided with housings, or retracting pegs for locking said pallet 14. Other known locking means can also be considered as part of this invention.

Advantageously, the lateral arms 15 are telescopic and are articulated on their carriage 16. The gripping devices 17 are articulated at the lower ends of the lateral arms 15.

FIG. 19 thus shows an example of a position in which the pallet 14 is inclined downwards in the upper part of the loading space.

FIG. 19 also illustrates a trailer 10 on which the structural elements 11 are made with uprights connecting the rails 12 and capable of supporting the walls, for instance, in the form of rigid or flexible covering elements.

The locking areas 22 or 23 advantageously contain housings for receiving retracting locking pegs cooperating with the pallets 14. As an example, when a pallet 14 reaches its loading position, the locking pegs engage into the corresponding housings of the walls or the lattices to lock said pallet 14 to the structure 11. Once the pallet 14 is locked, the gripping devices 17 disconnect from said pallet 14. The housings thus lock the pallet 14 by preventing it from moving, in particular in a horizontal and vertical direction.

As an alternative, the housings can be set out on the pallet 14 and the locking pegs be mounted on the chassis.

FIG. 19 illustrates the loading/unloading device in an extreme upper loading position. For pallet 14 to reach such a position, maximum or almost maximum contraction of the first control cylinder 24 and maximum or almost maximum extension of the second control cylinder 25 must be controlled. In this way, the pallet 14 is inclined downwards and towards the front.

In an example of a preferable implementation of the loading/unloading method according to the invention, the following steps are performed in succession.

During a first step a), primary data relative to the loads are input or imported into the logic controller 5. This primary data relates for instance to the size, weight and/or preferred orientation of each load.

During a step b), the optimal loading position for each load is determined, by means of the logic controller 5, according to the primary data and complementary data relative to requirements of loading and/or unloading, transport and/or load distribution. This complementary data is input by the operator, for instance.

During a step c), the automated movements of the motorized manipulator 6 are determined by means of the logic controller 5.

During a step d), a pallet in a storage position in the loading space is automatically picked up by means of motorized manipulator 6 and said pallet 14 is placed in a loading position at the rear of the vehicle. The pallet 14 is placed, for instance, flat on the floor.

Then, during a step e), a load is placed on pallet 14.

During a step f), by means of the motorized manipulator 6, the pallet 14 supporting the load is moved automatically to its optimal loading position and said loaded pallet 14 is locked on the structural elements 11 of the vehicle.

For the purpose of unloading, use is made of all the recorded data relative to loading, to determine according to a step g) an unloading sequence for the loaded pallets 14 placed in the loading space.

Then, according to a step h), the loaded pallet 14 is unlocked automatically and is moved by means of the motorized manipulator 6 to an outside unloading position at the rear of the vehicle.

According to a step i), the load is removed from pallet 14.

Finally, according to a step j), the empty pallet 14 is brought back and automatically deposited by means of the motorized manipulator 6, in a storage position in the loading space.

The loading positions and the unloading positions are generally located either directly on the ground or on a dock.

According to an implementation example according to the invention, the method consists in repeating the loading operations d) to f) and the unloading operations g) to j) in such a way as to load, and respectively unload, the vehicle in its entirety.

According to an implementation example according to the invention, the method consists in moving the motorized manipulator by guiding it over the structural elements in order to reach each of the determined loading positions.

According to an implementation example according to the invention, the method consists in loading/unloading a train of vehicles, such as a tractor vehicle and a trailer, comprising a first vehicle comprising a first loading space and a second vehicle comprising a second loading space.

According to an implementation example according to the invention, the method consists, on completion of the loading/unloading operations, in retracting the motorized manipulator 6 to a defined transport position on the structural elements.

Advantageously, the method consists in moving during the loading some of the pallets 14 from one storage area to another, in order to better distribute the loads on the vehicle.

The method preferably uses an onboard logic controller.

The method consists also in exchanging information between an operator, storage databases 1, 2, 3, and the logic controller 5 via wireless communication links. For this purpose, the operator has a device such as a PC computer, mobile telephone, or touch tablet.

The method according to the invention allows, according to an implementation example, to transmit to the operator loading instructions and in particular the driving direction on the pallets when the loads are cars or the identification of the loads to be placed on a pallet picked up by the motorized manipulator 6.

Advantageously, the data recorded in the storage databases 1, 2, 3 feeding the logic controller is updated regularly. For instance, the storage databases 1, 2, 3 are delocalized with respect to logic controller 5.

According to an implementation example according to the invention, the method consists in using a means of data input such as a PC, touch tablet or mobile phone, enabling the operator to input into the logic controller additional information, linked for instance to loading, to unloading, or to unexpected requirements which must be taken into consideration in performing the loading operations d) to f) or the unloading operations g) to j).

According to an implementation example according to the invention, the method consists in supplying the logic controller with an instruction to continue the loading or unloading operation, as soon as the respective operations for strapping or unstrapping the load are complete.

Advantageously, the method consists in sending instructions to the operator for strapping the loads between steps e) and f) or for unstrapping the loads during unloading. These operations are performed when the pallet 14 carrying a load is placed in a rear, stabilized and raised position with respect to the floor, as shown for example in FIG. 15.

It is obvious that the present description is not limited to the examples described explicitly but also includes other embodiments and/or implementations. Accordingly, a described technical feature may be replaced by an equivalent technical feature without going out of the framework of this invention and a described implementation step of the method can be replaced by an equivalent step without going out of the framework of the invention.

The invention claimed is:

1. Method for automatically loading a loading space delimited by structural elements of a vehicle or a container with loads using a manipulator and an operator, the method comprising:
   (a)—inputting or importing primary data relative to each of the loads, the primary data including at least dimensions, shape, weight, and position of center of gravity of each of the loads, into a logic controller,
   (b)—inputting, in real time by the operator, complementary data into the logic controller,
   (c)—automatically calculating in real time with the logic controller an optimal loading position for each of the loads according to the primary data and the complementary data,
   (d)—automatically determining automated movements of the manipulator for at least one of the loads with the logic controller as a function of an optimal loading position for the at least one of the loads calculated in step (c),
   (e)—automatically picking-up a pallet with the manipulator and positioning said pallet in a loading position of the vehicle or container,
   (f)—providing with the logic controller loading instructions to the operator, the loading instructions including identification of one of the loads to be placed on the palette and a driving direction on the pallet when the one of the loads is a vehicle having the driving direction,
   (g)—placing the one of the loads on the pallet according to the loading instructions, and
   (h)—automatically moving the pallet carrying the one of the loads with the manipulator to the optimal loading position for the one of the loads using the automated movements for the at least one of the loads determined in step (d) and locking said pallet on the structural elements of the vehicle or container automatically and under the control of the logic controller.

2. Method according to claim 1, wherein (h) automatically moving the pallet carrying the one of the loads with the manipulator is practiced in a guided way over the structural elements.

3. Method according claim 1, wherein the vehicle or container comprises a train of vehicles and wherein the train of vehicles comprises at least a first vehicle comprising a tractor having a first optimal loading position and a second vehicle comprising a trailer having a second optimal loading position.

4. Method according to claim 1, wherein the method further comprises, after step (h), (i) retracting the manipulator to a defined transport position on the structural elements.

5. Method according to claim 1, wherein the method utilizes a plurality of loaded pallets, and wherein the method further comprises moving some of the plurality of loaded pallets to better distribute the loads on the vehicle or container.

6. Method according to claim 1, wherein the logic controller comprises an onboard logic controller.

7. Method according to claim 1, wherein complementary data comprises information linked to at least one of loading, unloading, and unexpected requirements.

8. Method according to claim 1, wherein the loads comprise cars.

9. Method according to claim 1, wherein the method further comprises:

(i)—using the primary data, the complementary data, and the optimal loading position for each of the loads, determining unloading movements for the manipulator for each of the loads, (j)—automatically unlocking the pallet and moving the pallet carrying the one of the loads using the manipulator and the unloading movements determined for the one of the loads in step (i) to an unloading position of the vehicle or container, (k)—removing the one of the loads from the pallet, and (l)—automatically moving the pallet using the manipulator to a storage position.

10. Method according to claim 9, wherein the method further comprises repeating steps (e) to (h) and repeating steps (i) to (k).

11. Method according to claim 1, wherein inputting or importing data into the logic controller is practiced by exchanging data with one of the operator and data storage databases, and wherein exchanging data with the operator is practiced via a wireless communication link connecting the logic controller to operator equipment.

12. Method according to claim 11, wherein the method further comprises regularly updating data recorded in the data storage databases.

13. Method according to claim 12, wherein the data storage databases comprise delocalized data storage databases with respect to the logic controller.

14. Method according claim 1, wherein the method further comprises, after step (g), (i) immobilizing the pallet carrying the one of the loads at a given height, and (j) strapping the one of the loads to the pallet at the given height.

15. Method according to claim 14, wherein the method further comprises, after (j), (k) supplying the logic controller with an instruction to continue to step (h).

16. Method according to claim 14, wherein the method further comprises, before (j), (m) transmitting instructions to the operator for strapping the one of the loads to the pallet.

17. Loading device for implementing the method according to claim 1, the device comprising:
 a manipulator designed to work together with the vehicle or container,
 an on-board or remote intelligence means,
 a logic controller controlling the automatic movements of the manipulator according to calculations of the intelligence means, the calculations using at least one of the primary data and the complementary data,
 picking up and orientation devices enabling the manipulator to pick up and orient the pallets,
 guidance and orientation means for moving and orienting the manipulator along the structural elements of the vehicle or container,
 means of locking the pallet in the optimal loading position on the structural elements by means comprising automated actuating devices controlled by the logic controller, and
 means of communication between the logic controller and the operator supervising the automated loading operations.

18. Loading device according to claim 17, wherein the structural elements and the pallet further comprise respective attaching devices cooperating together to lock the pallet in the optimal loading position on the structural elements.

19. Loading device according to claim 17, wherein the manipulator is associated with the vehicle or container and carried on the vehicle or container.

20. Loading device according to claim 17, wherein the manipulator is associated with a loading base and remains on the loading base.

21. Loading device according to claim 17, wherein the manipulator has two lateral articulated arms designed to pick up the pallet, each lateral arm mounted to swivel on a carriage moving along a guide rail arranged on the structural elements.

22. Loading device according to claim 21, wherein each guide rail is electrically conducting, is connected to a source of electric energy, and conducts electric energy to each respective carriage.

23. Loading device according to claim 21, wherein each of the two lateral arms are telescopic.

24. Loading device according to claim 21, wherein each guide rail has a mobile or telescopic section enabling said guide rail to lengthen.

25. Method for loading a loading space delimited by structural elements of a vehicle or a container with loads using a manipulator, the method comprising:
 (a)—inputting or importing primary data relative to each of the loads into a logic controller,
 (b)—automatically calculating with the logic controller an optimal loading position for each of the loads according to the primary data and complementary data relative to at least one of loading, unloading, transport, and load distribution requirements of the loads,
 (c)—automatically determining automated movements of the manipulator for at least one of the loads with the logic controller as a function of each optimal loading position calculated in step (b),
 (d)—automatically picking up a pallet with the manipulator and positioning the pallet in a loading position of the vehicle or container,
 (e)—placing one of the loads on the pallet,
 (f)—automatically moving the pallet carrying the one of the loads with the manipulator to the optimal loading position for the one of the loads using the automated movements determined in step c) and locking the pallet on the structural elements of the vehicle or container automatically and under the control of the logic controller, and
 (g)—automatically checking the locking of the pallet on the structural elements by:
  g1)—pulling the pallet with the manipulator,
  g2)—using force sensors, detecting a force when pulling, and
  g3)—when no force is detected, moving the pallet with the manipulator.

* * * * *